United States Patent
Kuno et al.

(10) Patent No.: US 7,117,201 B2
(45) Date of Patent: Oct. 3, 2006

(54) RESOURCE SEARCHING

(75) Inventors: Harumi Anne Kuno, Cupertino, CA (US); Daniel Alan Muntz, Cupertino, CA (US); Michael J. Lemon, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 480 days.

(21) Appl. No.: 10/102,353

(22) Filed: Mar. 20, 2002

(65) Prior Publication Data
US 2003/0182270 A1  Sep. 25, 2003

(51) Int. Cl.
*G06F 17/00* (2006.01)
*G06F 7/00* (2006.01)

(52) U.S. Cl. .................... 707/3; 707/1; 707/2
(58) Field of Classification Search .......... 364/242.94, 364/284.4; 707/1–10, 102, 104.1
See application file for complete search history.

(56) References Cited

U.S. PATENT DOCUMENTS

| | | | |
|---|---|---|---|
| 5,511,208 A * | 4/1996 | Boyles et al. | 709/223 |
| 6,480,835 B1 * | 11/2002 | Light | 707/3 |
| 6,546,388 B1 * | 4/2003 | Edlund et al. | 707/2 |
| 6,611,829 B1 * | 8/2003 | Tate et al. | 707/10 |
| 6,721,741 B1 * | 4/2004 | Eyal et al. | 707/10 |
| 2002/0133491 A1 * | 9/2002 | Sim et al. | 707/10 |

* cited by examiner

*Primary Examiner*—Sam Rimell
*Assistant Examiner*—Mellissa M. Chojnacki (57) ABSTRACT

A system and method for resource handling provides for receiving a query and providing a response. The query is used to search resources locally available. Metadata is associated with each of the resources. The resources and the metadata are both analyzed with respect to the query such that a response indicative of a match between at least two of the resources and the query is a ranked search result included in the response. The invention is exemplified in an adaptation to peer-to-peer network applications.

24 Claims, 5 Drawing Sheets

RESOURCE SEARCHING

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND

1. Field of Technology

The field of technology relates generally to distributed resource searching.

2. Description of Related Art

In many operational environments, resources are distributed rather than being contained at one central depository.

For example, among many advancements to the computing field, the increasing preference for sharing computer resources and information, the decreasing cost of powerful computers and workstations, the widespread use of networks, the Internet, and the maturity of software technologies is increasing the demand for more efficient information retrieval mechanisms.

In general, the handling of queries with respect to specified topics is inefficient. For example, "Peer-to-Peer" (P2P) communications as a form of networking is becoming increasingly popular because P2P offers significant advantages in simplicity, ease of use, scalability, and robustness. P2P systems are communications networks where any currently connected computing device (also referred to as an Internet "edge node" or "fringe node") can take the role of both a client and a server. Generally, P2P systems are networked personal computing devices (e.g., personal computer (PC), personal digital assistant (PDA), Internet-capable wireless telephones, and the like), where each network node has no fixed Internet Protocol (IP) address and therefore is outside the Internet's Domain Name System (DNS; viz., where an IP address like "232.452.120.54" can be something like "xyz.com"). P2P is a way of decentralizing not just features, but costs and administration as well.

P2P computer applications are a class of applications that takes advantage of resources (e.g., storage, cycles, content, human presence, and the like) available on the fringe of the Internet. However, accessing such decentralized resources means operating in an environment of unstable connectivity and unpredictable location since the nodes operate outside the DNS, having significant or total autonomy from central servers. At the same time, it is an advantage of such systems that communications can be established while tolerating and working with the variable connectivity of hundreds of millions of such fringe nodes. There is therefore a requirement for P2P system designers to solve connectivity problems. A true P2P system must (1) treat variable connectivity and temporary network addresses as the norm, and (2) give the Internet fringe nodes involved in the network some significant autonomy.

Figure 1:
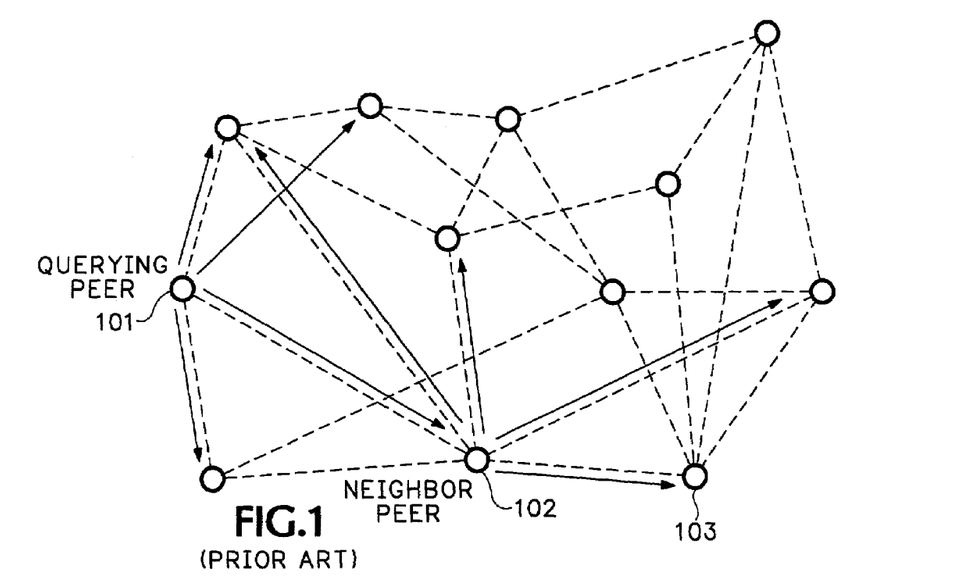
FIG. 1 (Prior Art) illustrates a Gnutella-type peer-to-peer network.

One known P2P network protocol, known as GNUTELLA™ network protocol, is a file sharing technology, offering an alternative to web search engines used in the Internet, with a fully distributed mini-search engine and a file serving system for media and archive files that operates on an open-source policy of file sharing. Another commercial example is the MORPHEUS™ file sharing system. FIG. 1 (Prior Art) illustrates a P2P structure and searching in the GNUTELLA™ P2P network. In essence, each node (each circle symbol represents a computing device). Individual host nodes 101, 102, 103, and the like, store resources, e.g., a database of documents or other content. Moreover, each peer uses its own local directory structure to store its copy of each of the resources. Any peer can propagate a search request, or "query," illustrated in FIG. 1 by arrows as broadcast by a first "Querying Peer" 101 to all of its "Neighbor Peers" 102. Note that a neighbor peer becomes the querying peer when it passes a search request on to its neighbors which are not in direct communication with the first Querying Peer 101, e.g., node 103. In other words, each peer not only searches its own directory for the resource-of-interest of the query, but broadcasts the query to each of its neighbor peers. While individual hosts are generally unreliable with respect to availability at any given moment, the resources themselves, i.e., the content being sought, tend to be highly available because resources are replicated and widely distributed in proportion to demand. Generally, however individual preferences are identified only by file name and file names are subject to the individual preferences of each node for its local directory structure. Thus, one specific problem is how to search intelligently and efficiently for relevant resources in a P2P network.

Again, it is common to store content data files at each peer's local directory structure simply by the given file name. For example, web sites such as NAPSTER™ music download site simply store data by a file name associated with the artist or specific song title, e.g., "artist name", to facilitate searching. Simple descriptor queries thus get a very large number of unranked returns. In fact, even a web site search engine in a non-P2P system, such as the commercial GOOGLE™, ALTA VISTA™ and the like internet search engines, provides all return links potentially relevant to a query-namely, each and every file found which has a match to the query —which the user must then study for relevance to the actual interest intended and then visit serially those which actually may be authoritative. That is, all of these web search engines rely upon the existence of user information in the form of web pages containing links. Web search engines may provide ranking algorithms by which they measure the degree to which a web page answers a query (the authority of a given web page). All of these web search engines rely on the existence of user information to measure the authority of a given web page —for example, web pages containing links to a given web page, or terms occurring within the content of the web page, or web page links contained by the web page. This form of evaluation will not work for P2P systems that, due to the transient nature of the P2P network, do not support the concept of a link.

Another method, storage at a given node by random names in order to hide actual file identity, raises the problem of need for some form of central index that can be searched.

Another method is collaborative filtering where patterns of searches by like-minded searchers are analyzed and leveraged to produce allegedly more relevant results in response to a specific query. Such analysis inherently requires real time delays in providing an answer message to the query.

In general, existing solutions focus on locating every specific instance of each of the resources that is a potential match to the query. Thus, a replicated resource is likely to appear multiple times in responses to a specific query.

Moreover, none of these methods provide any ranking of the resources. In other words, there is no measure of authority as to how authoritative any particular peer is as to the resource-of-interest, e.g., what is the peer's resource capability with respect to the topic of "jazz music."

BRIEF SUMMARY

In a basic aspect, there is provided a system and method for resource handling. In an environment for receiving a query and for providing a response, the query is used to search resources locally available. Metadata is associated with each of said resources. The resources and said metadata are both analyzed with respect to the query such that said response indicative of a match between at least two of said resources and said query is a ranked search result included in said response. The invention is also suited for peer-to-peer network applications.

The foregoing summary is not intended to be an inclusive list of all the aspects, objects, advantages and features of described embodiments of the present invention nor should any limitation on the scope of the invention be implied therefrom. This Summary is provided in accordance with the mandate of 37 C.F.R. 1.73 and M.P.E.P. 608.01 (d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS

Like reference designations represent like features throughout the drawings. The drawings referred to in this specification should be understood as not being drawn to scale except if specifically annotated.

DETAILED DESCRIPTION

Reference is made now in detail to embodiments of the present invention, illustrating the best mode presently contemplated for practicing the invention. In order to explain the details of embodiments of the present invention an implementation for peer-to-peer network environment resource handling is used; no limitation on the scope of the invention is intended nor should any be implied therefrom.

Figure 2:
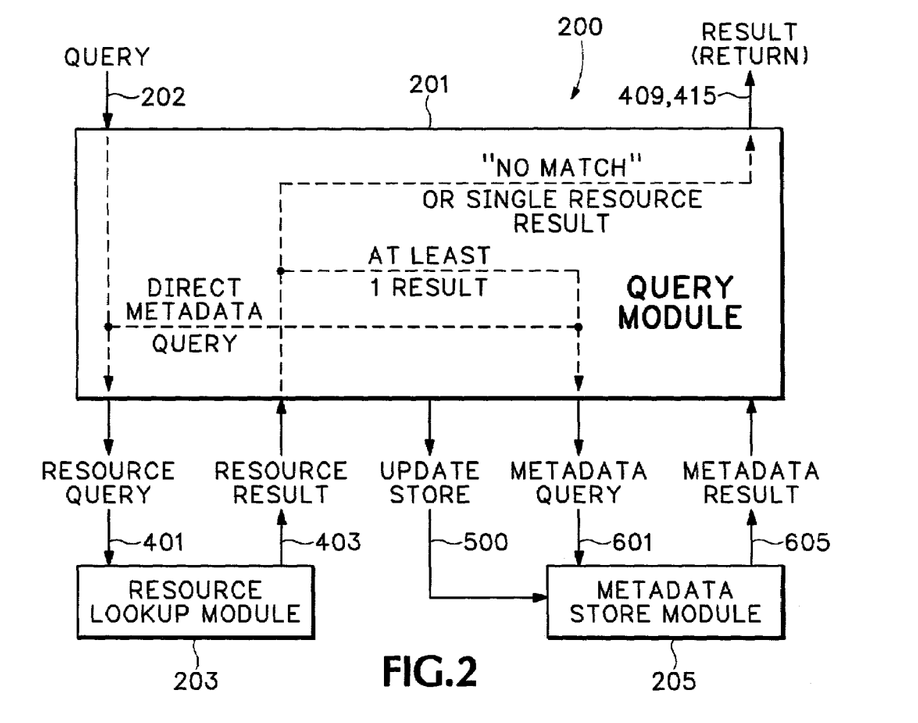
FIG. 2 is a schematic system block diagram according to an embodiment of the present invention.

As schematically illustrated generally in FIG. 2, one solution for searching problems associated with a P2P network environment is to provide each node with a system 200 for generating and using metadata associated with answering peer queries. "Metadata" in this context will be arbitrary name/value pairs (or other multiple combinations 1/2/3, et seq., also referred to as "tuples") that are associated with and derived from a specific directory, but which are not necessarily contained in the specific directory. That is, components of a directory—names, paths, and the like—are metadata whereas the content itself is the resource data. It has been determined that when answering a query searching for responsive resources, finding resources using metadata allows ranking of the results.

Each peer is provided with a query module 201. The query module 201 is associated with a peer's resource lookup module 203, where the resource lookup module 203 is the peer's specific engine for looking to its own directory structure to determine if there is a match between a specific query and its own local set of resources, viz., the locally stored data files. Primary functions of the query module 201 are to create a metadata database, e.g., tables or the like, that correlate resource identities with directory path names and to use the metadata in providing returns to specific queries. In effect, to create metadata the query module 201 parses the components of the directories it has and those it encounters from its neighbor peers and creates an association between any specific resource and the host's storage location(s). A metadata store module 205 is provided for storing metadata that is associative with specific queries. It will be recognized by those skilled in the art of computer science that while the system 200 shown as discrete modules, the present invention is generally implemented in software which may appear seamless; therefore, no limitation on the scope of the invention is intended nor should any be implied therefrom.

Figure 3A:
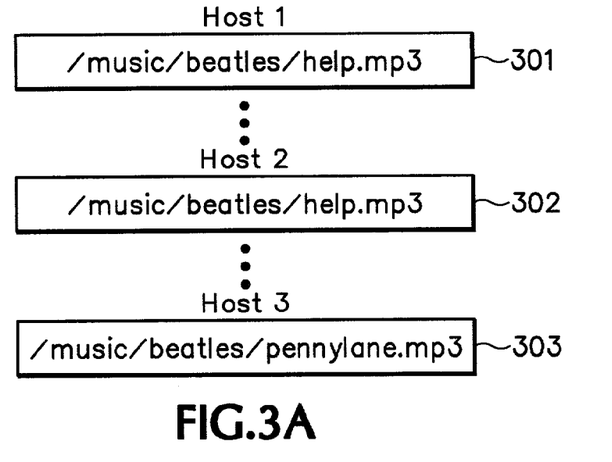
FIGS. 3A, 3B, and 3C are examples of data associated with distributed resource identity data, access data information, and derived metadata according to an embodiment of the present invention.
Figure 3B:
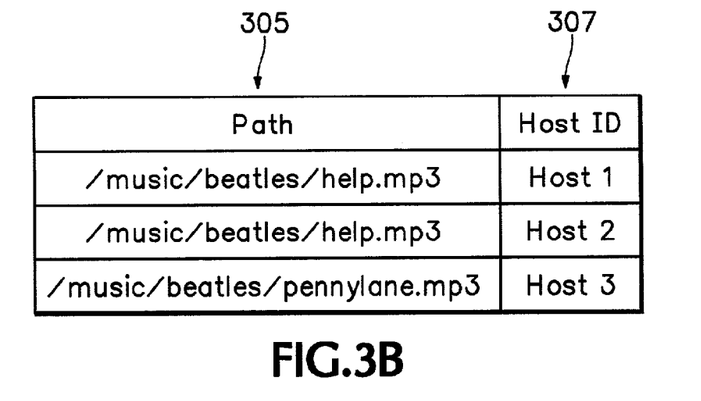
Figure 3C:
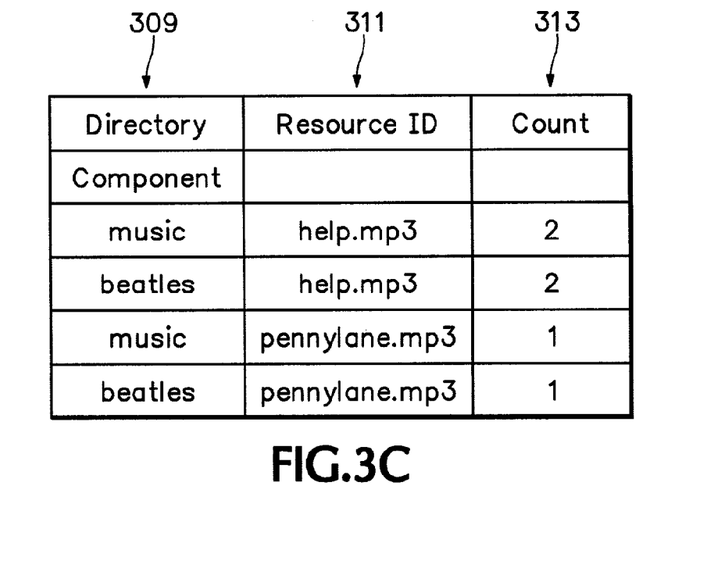

FIGS. 3A–3C provides an example of three host peers, HOST 1, HOST 2, HOST 3, and two related resources stored at each local directory structure 301, 302, 303, respectively, namely the song content "help.mp3" at both HOST 1 and HOST 2 and the song content "PennyLane.mp3" at HOST 3. In other words, HOST 1 and HOST 2 store content that is the Beetles song "Help" in each's respective directory path "/music/beetles/help.mp3" and HOST 3 stores the song content "Penny Lane" in its directory path "/music/beetles/PennyLane.mp3." FIG. 3B shows this In table form. One column, data set, 305 lists the directory paths, while the other column, data set, 307 lists the host peer identification, e.g., a MORPHEUS™ file sharing system peer identification such as "102.12.97.42:1214." Also in table form for convenience of explanation, FIG. 3C shows the parsing of the available information relevant to the query for generating metadata for answering queries. A first column, data set, 309 breaks up the directories into path components. "music" and "beetles." A second column, data set, 311 associates the resource identifier, that is the resource file names "help.mp3" and "pennylane.mp3" with each path related component. A third column, data set, 313, associates a frequency count of directory components associated with resources; "music" with "help.mp3" and "beetles" with "help.mp3" is used at both Host 1 and Host 2, therefore the count is two; similarly "music" with "pennylane.mp3" and "beetles" with "pennylane.mp3" only is used at Host 3, therefore the count is one. In other words, an internal metadata store 205 is compiled, associating resources with each individual directory path component in which the content is located, including some means of counting how often a given directory path element name is associated with a resource. Probabilistic strength of the association is also compiled as explained In more detail hereinafter. Generally, now the local directory path name components so associated with Individual resources can be treated as metadata to be leveraged when answering specific queries. Note that once a metadata store is in use, it can also store metadata results from every query to every neighbor peer, viz., historical metadata sets related to each query.

Figure 4:
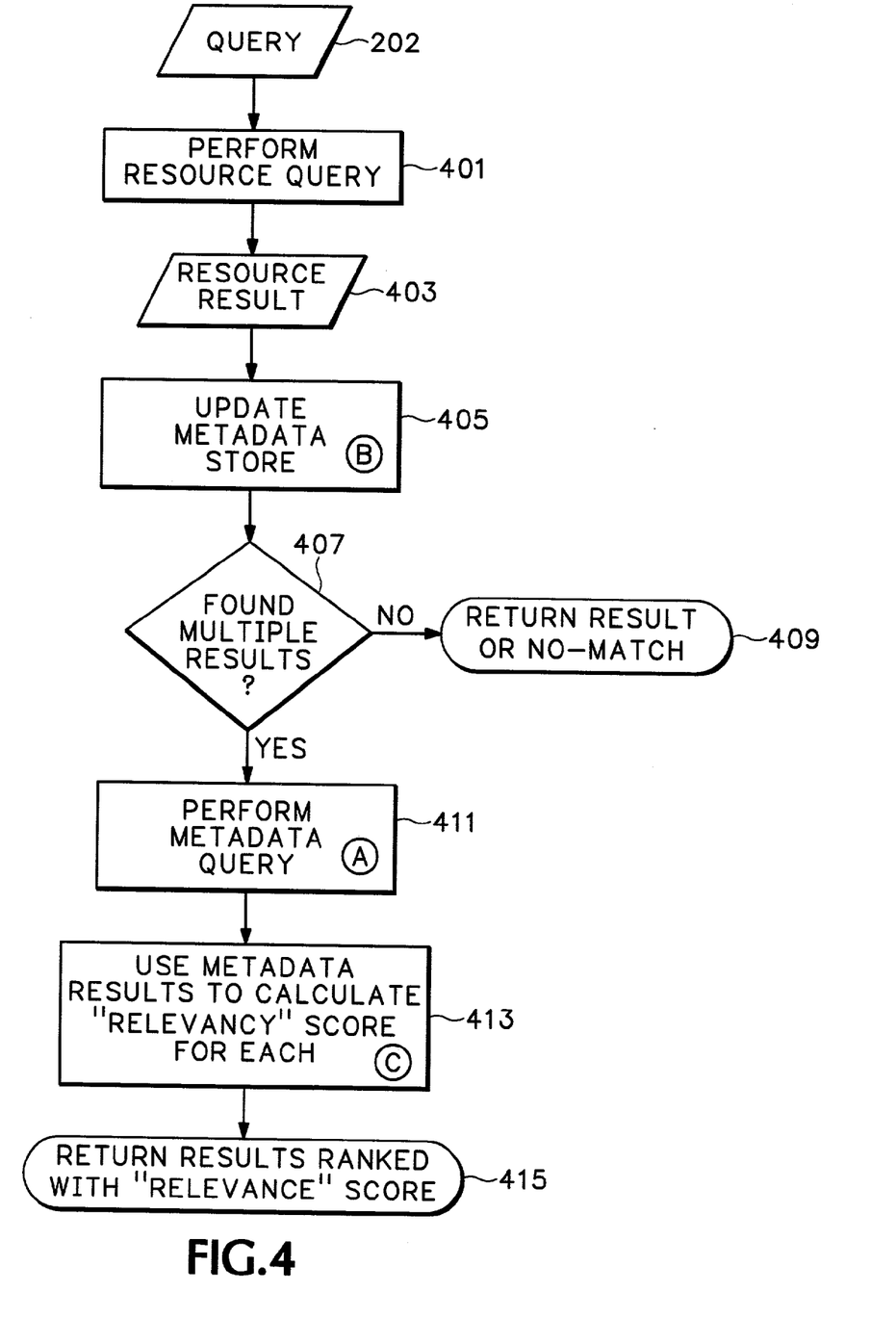
FIG. 4 is a flowchart for an exemplary methodology for the query module of the embodiment as shown in FIG. 2.

Turning now also to FIG. 4, there is shown a flowchart for the method of operation 400 of the query module 201. A specific query 202 is received from a peer by the query module. The query module 201 looks to its own resource database, performing a local resource query 401 using its own local resource lookup module 203; viz., the peer receiving the query searches its local resource directories for a match to the query. The results 403, viz., match(es) and related directory information, e.g., a uniform resource locator ("URL") or a signal indicative of "no match," are returned to the query module 201.

Figure 5:
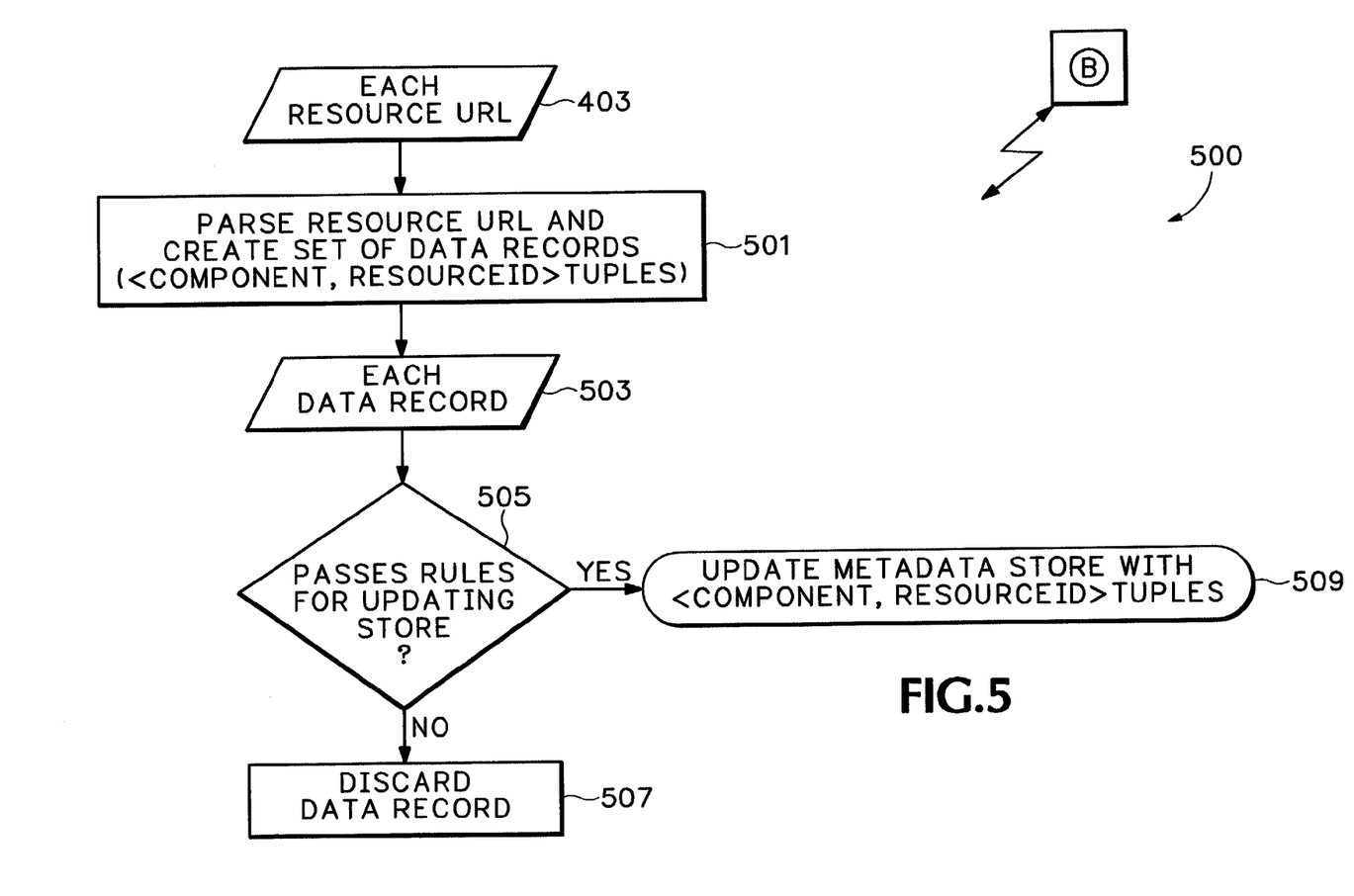
FIG. 5 is a flowchart of detail for an exemplary methodology for updating the metadata store module of the embodiment as shown in FIGS. 2 and 4.

The query module 201 is given the task and rules of using the resource result 403 to update 405 the metadata store module 205. FIG. 5 is a flowchart for a process of updating 405 the metadata store module 205. Assume that multiple resource results 403 are found. The query module 201 parses 501 each resource URL and creates a new set of metadata records 503 substantially like the tables in FIGS. 3B and 3C, step 501. For example, each of these metadata records may be a "tuple" set, such as:

<directory path component 1, resource ID>,
<directory path component 2, resource ID>, et seq. (see FIG. 3C), or the like. Optionally, the metadata record may also want to indicate as added metadata the position of each component in a directory path; e.g. from FIG. 3B, <music, {position} 1, help.mp3, {position} 3. A comparison of the current created tuple is made against the rules 505. If the current tuple does not pass the test, the record is discarded 507. If the current tuple does pass the test, the metadata store 205 is updated to now include the new data record for each resource result 403.

Returning to FIG. 4, if only one match or no match was found via the resource lookup module 203, step 407, no-path, either a "no-match-message" or the single result is returned 409 to the query source peer (e.g., FIG. 1, node 101). If query-matching resource results were found via the resource lookup module, step 407, yes-path, a metadata query is performed 411. In other words, there is a likelihood that something in the query 202 has been encountered previously and thus a previous metadata store 205 update has also been performed. As the metadata store 205 may now contain information regarding neighboring peers' directory resource storage, searching the metadata may locate such off-peer resources.

Figure 6:
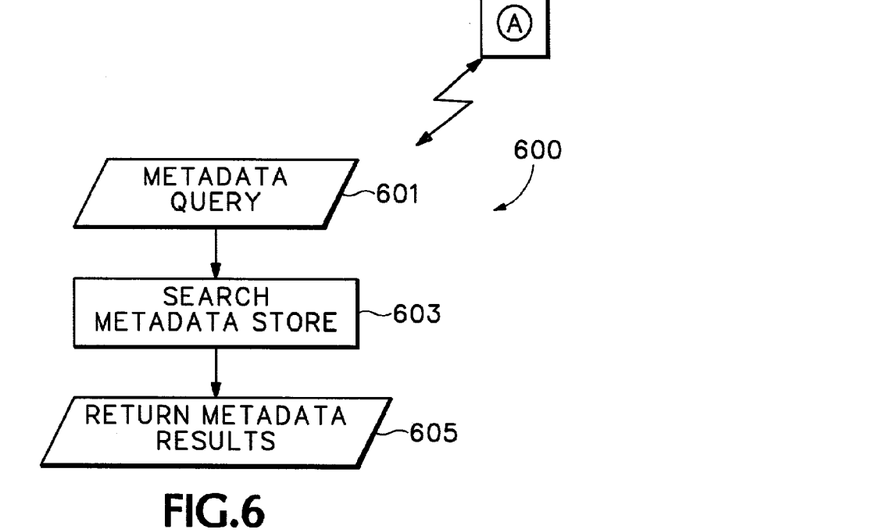
FIG. 6 is a flowchart of detail for an exemplary methodology for handling metadata queries in the embodiment as shown in FIGS. 2 and 4.

FIG. 6 is a flowchart illustrating a process 600 of the query module 201 adding a metadata query to the query/return operation 400. The query module 201 now has information from the resource lookup module 203 indicative of the fact that there are multiple known returns 407, yes-path, responsive to the specific query 202. The query module 201 thus issues a metadata query 601 to the metadata store module 205. The metadata query 601 is tailored in any specific data form implementation of the store module 205. The metadata store module 205 searches its records 603 accordingly and returns all matches so determined 605. Optionally, it should be recognized that even if no match is found in the resource lookup module 203, once a metadata store module 205 is established, a metadata query process 600 can and preferably should be made; thus if historical metadata as mentioned herein before is in the store module 205, the results 605 of a metadata query 601 can be positive—it is known that some neighboring peer has a matching resource—even when the local resource query 401 search result is negative.

Figure 7:
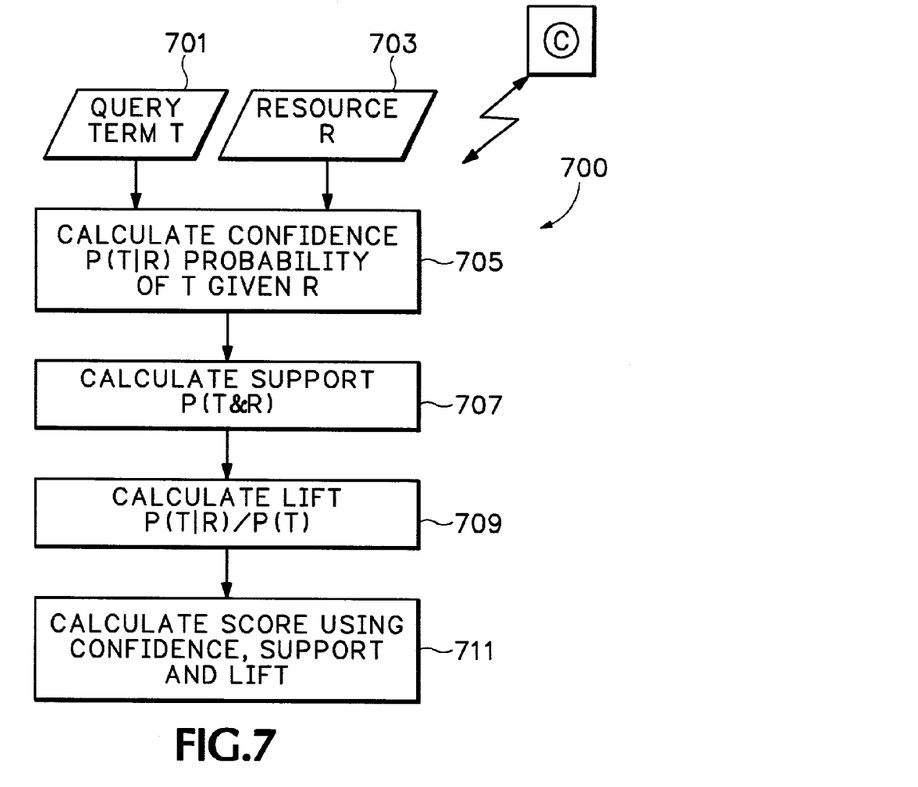
FIG. 7 is a flowchart of detail for an exemplary methodology for calculating relevancy for query responsive resources in the embodiment as shown in FIGS. 2 and 4.

Returning again to FIG. 4, the query 601 into the metadata store 205 has provided metadata search results 605. The metadata results 605 are used by the query module 201 to calculate 413 a probabilistic "relevancy" score for each; that is, when multiple matches are determined, ranked results are to be returned 415 to the querying peer based on the data such as illustrated in FIG. 3C. FIG. 7 is a flowchart of an exemplary embodiment of a process 700 for calculating the relevancy score for determined resources using the metadata. Other known manner data mining methods of calculating relevancy include association rules, mapping terms into categories, clustering, and the like, may be adapted for a specific implementation. Note that in the state of the art for data mining—for example using association rules (means for measuring correlation between individual resources that appear together)—such metrics, known to practitioners as Confidence, Support, and Lift, can be calculated via a variety of algorithms and independently of each other, in any order. No limitation on the scope of the invention is intended nor should any be implied from the specific implementation shown in FIG. 7.

From a specific query term "T" (e.g., "beetles") and the resource data set "R," Confidence probability of "T" given "R" is calculated, P(T/R), 705. In other words, for example, a Confidence may be calculated as to whether a them 't' will appear in the same tuple as a resource 'r' by calculating how likely it is that the term 't' will occur when the resource 'r' has occurred. This probability may be calculated by counting the number of occurrences of term 't' associated with resource 'r' and then dividing that number by the total number of occurrences of resource 'r'. For example, from FIGS. 3B and 3C, there is 100% Confidence that term 'beetles' is associated with the resource 'help.mp3'.

Support is calculated, P(T&R), 707. In other words, for example, calculate a Support by measuring how often a term 't' and a resource 'r' occur together as a percentage of all the resources. This probability can be calculated by counting the number of occurrences of term 't' associated with resource 'r' and then dividing that number by the total number of resources in the data set. For example, from FIGS. 3B and 3C, we can see that there is ⅔ Support for the term 'beetles' to be associated with the resource 'help.mp3'.

Lift is calculated, P(T/R)/P(T), 709. In other words, for example, calculate a Lift by measuring the impact of associating a term 't' and a resource 'r'. One way to measure this is to estimate the probability that term 't' occurs with resource 'r', and then divide that number by the probability that term 't' will occur at all and the probability that resource 'r' will occur at all. For example, from FIGS. 3B and 3C, there is a 100% probability that term 'beetles' will occur, a ⅔ probability that resource 'help.mp3' will occur, and a 100% Confidence that the term 'beetles' occurs with 'help.mp3'. The Lift is thus 3/2.

From Confidence, Support, and Lift, a Score for each result is calculated 711. In other words, for example, assign a value that reflects the degree to which a resource matches a query term. One way to measure this is to use the Lift value, minus 1. Once we have Scores reflecting a resource's relevancy for all terms in a query, we can calculate a complete "relevancy" score for the resource. In other words, for example, one way to calculate the complete relevancy Score would be to combine the resource's relevancy scores in regards to each of the query terms. Thus, a resource that was "highly relevant" to all of the query terms would be ranked higher than a resource that was "highly relevant" to only some of the query terms, et seq.

As another exemplary embodiment for determining a relevancy score, use clustering techniques by applying existing taxonomies, and mapping the query terms into categories before calculating the relationship between a resource and the categories. Other relevancy determination processes can be adapted and may be employed for any specific implementation.

Returning again to FIG. 4, the query module combines each resource result with its related Score and returns the now ranked results 415 to the querying peer.

Note that many options can be incorporated into a specific implementation of the process of using a system 200 for generating and using metadata for answering P2P queries. For example, as a first option, it is possible and may be desirable to allow users to query upon the metadata itself directly, preferably using regular expressions. A querying peer in the embodiments do not need knowledge that the neighbor(s) to which the query was broadcast are using the present system 200. But, if the querying peer does have that knowledge, it may wish to make a metadata-direct query (in FIG. 2 this is indicated by the phantom-line path from the query 202 directly to the metadata query 601). More specifically, suppose that a user types a query for "music/*/beetles," indicating a specific directory structure is being sought. The return from the metadata store module 205 can be directly used to return both "help.mp3" and "pennylane.mp3" resources because they both have support for that pattern. The ranking may be less important to such direct results depending on the vagueness of the query. A second option is the level of discretion implemented when forming rules for the building of the metadata store module 205. For example, there may be no desire for a specific store module to keep statistics for directory paths that match certain broad, generic or universal, naming patterns, e.g., "hpux." If the metadata store is all "hpux" related anyway, storing such statistics would only bloat the store. Such an option can be built into the rules for updating the store 505. A third option is to provide the ranked results with a mechanism for directly accessing a specific resource (e.g., a hypertext link or the like) so that the querying peer can make a direct connection if the resource-of-interest is not already a direct neighbor peer.

Thus in accordance with embodiments of the present invention a system and process for generating and using metadata for answering search queries in a P2P environment. Resources are ranked based on pre-existing metadata, such a references (links) to the resource host(s), collaborative filtering, and analysis of the content. The system and process are particularly effective in environments such as peer-to-peer networks and the like where resources are replicated but little meta-information about them exists other than their identifiers, resources are stored in a hierarchical directory structure, or resources are intermittently available.

The foregoing description of embodiments of the present invention have been presented for purposes of illustration and description. It is not intended to be exhaustive or to limit the invention to the precise form or to exemplary embodiment(s) and implementation(s) disclosed. Obviously, many modifications and variations will be apparent to practitioners skilled in this art. Similarly, any process steps described might be interchangeable with other steps in order to achieve the same result. At least one embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . "

What is claimed is:

1. A system for resource handling comprising:
   means for receiving a query and for providing a response;
   means for using said query to search resources available to said means for receiving, said means parses components of a directory paths for said resources to generate metadata associated with the resources wherein the components of the directory paths are defined by individual preferences;
   means for storing the metadata respectively associated with each of said resources; and
   means for determining a relevancy score for resources using said metadata;
   wherein said query is correlated with said resources and said metadata both such that said response indicative of a match between at least two of said resources and said query is a ranked search result included in said response.

2. The system as set forth in claim 1 wherein said resources available further include location information associating said system with subsidiary systems in direct communication therewith, wherein upon a determined correlation of said location information to said query, any match is included in said response.

3. The system as set forth in claim 2 wherein said response includes means for directly accessing said subsidiary systems.

4. The system as set forth in claim 1 further comprising:
   storing said components in a combinatory data set indicative of content with said components as said metadata.

5. The system as set forth in claim 4 comprising: rules for predetermining if the combinatory data set is compatible with said means for storing.

6. Then system as set forth in claim 4 wherein said components include sub-information related to specific addressing elements related to accessing each of said resources.

7. The system as set forth in claim 1, said means for receiving further comprising:
   means for recognizing a direct metadata query and directly routing said query to said means for storing metadata.

8. The system as set forth in claim 1 wherein said relevancy score is provided in the ranked search result of said response.

9. The system as set forth in claim 8 wherein said relevancy score is calculated from a probability analysis of said metadata.

10. The system as set forth in claim 9 wherein said probability analysis includes calculating a relevancy score based on Confidence, Support, and Lift of each said resource associated with the response.

11. A method for handling resource allocation and retrieval, the method comprising:
    storing resources;
    parsing components of directory paths of the resources in order to generate metadata wherein the components of the directory paths are defined by individual preferences;
    storing the metadata respectively associated with each of said resources;
    receiving a query potentially associated with said resources;
    performing said query on said resources and on said metadata for locating any potential match; and
    responding to said query with ranked results indicative of relevancy of each of said resources having a potential match to said query;
    wherein said relevancy is based, at least in part, on said metadata.

12. The method as set forth in claim 11 comprising:
    if only a single match to said query is located among said resources, returning information related to retrieving said single match, and updating said metadata based on said information.

13. The method as set forth in claim 11 comprising:
    if a plurality of matches to said query is located among said resources, comparing each of said matches to said metadata, ranking each of said matches as to relative relevancy with respect to said query prior to said responding to said query with ranked results.

14. The method as set forth in claim 11 wherein said resources are distributed in a peer-to-peer network environment.

15. The method as set forth in claim 14 wherein said metadata includes data sets of historical matches related to neighbor peers of said peer-to-peer network environment.

16. The method as set forth in claim 14, wherein said metadata further comprises data sets having each component of each directory path of said directory paths related to a resource identifier for a resource of said directory path.

17. The method as set forth in claim 16 comprising:
    parsing each said directory path such that each said component is related to a value indicative of its position in said directory path.

18. The method as set forth in claim 14 wherein said ranked results indicative of relevancy provides a measure of authority as to how authoritative any particular peer is as to the resource-of-interest.

19. A computer-readable medium executable on a computer comprising:
    computer code for looking up a content file directory location and content identity based on a query;
    computer code for parsing a respective directory path related to each content file that is matched to said query in order to form metadata wherein said respective directory path is defined by individual preference;
    computer code for storing the metadata relating each said content file that is matched to said query by content identity coupled to each element of said respective directory path;
    computer code for returning an answer to said query indicative of said content file directory location and said content identity wherein each content file that is matched to said query is ranked in accordance with said metadata; and
    computer code for calculating at least one relevancy score based on said metadata for each content file that is matched to said query.

20. The computer-readable medium as set forth in claim 19 in a peer-to-peer network environment.

21. The computer-readable medium as set forth in claim 20, said computer code for storing metadata comprising:
    computer code for storing metadata for each content file that is matched to said query wherein said content file directory location is at a neighbor peer.

22. A method of doing business in a network of distributed content files, the method comprising:
    providing at least one directory wherein said directory includes some of said distributed content files;
    providing remote access to said directory via submission of a query;
    associating each of said content files with a related metadata set wherein for each one of said content files the related metadata set includes parsed individual path elements of a directory path into said directory wherein the individual path elements are defined by individual preference and each of said path elements is associated with a content identifier, such that a ranking of the content file associated with each of said files is established, said ranking based, at least in part, on said metadata; and
    providing a search result to the query wherein said ranking of each match of the query to a content file is included in said result.

23. The method as set forth in claim 22 comprising:
    providing rules for storing a metadata set, and maintaining a database including each metadata set complying with said rules for storing.

24. The method as set forth in claim 23 comprising:
    providing access to said database via said query.

* * * * *

UNITED STATES PATENT AND TRADEMARK OFFICE
CERTIFICATE OF CORRECTION

PATENT NO. : 7,117,201 B2
APPLICATION NO. : 10/102353
DATED : October 3, 2006
INVENTOR(S) : Harumi Anne Kuno et al.

Page 1 of 1

It is certified that error appears in the above-identified patent and that said Letters Patent is hereby corrected as shown below:

In column 4, line 42, delete "Beetles" and insert -- Beatles --, therefor.

In column 4, line 43, delete "beetles" and insert -- beatles --, therefor.

In column 4, line 44, delete "beetles" and insert -- beatles --, therefor.

In column 4, line 54, delete "beetles" and insert -- beatles --, therefor.

In column 4, line 59, delete "beetles" and insert -- beatles --, therefor.

In column 4, line 62, delete "beetles" and insert -- beatles --, therefor.

In column 6, line 28, delete "beetles" and insert -- beatles --, therefor.

In column 6, line 39, delete "beetles" and insert -- beatles --, therefor.

In column 6, line 47, delete "beetles" and insert -- beatles --, therefor.

In column 6, line 56, delete "beetles" and insert -- beatles --, therefor.

In column 6, line 58, delete "beetles" and insert -- beatles --, therefor.

In column 7, line 29, delete "beetles" and insert -- beatles --, therefor.

In column 8, line 56, in Claim 6, delete "Then" and insert -- The --, therefor.

Signed and Sealed this

Twenty-eighth Day of April, 2009

JOHN DOLL
*Acting Director of the United States Patent and Trademark Office*